United States Patent Office 2,916,392
Patented Dec. 8, 1959

2,916,392

AIR DRYING FILMS FROM UNSATURATED FATTY ACID METAL SALTS

Earl C. Chapin, Springfield, and Mary E. Murphy, East Longmeadow, Mass., assignors to Monsanto Chemical Company, St. Louis, Mo., a corporation of Delaware No Drawing. Application April 7, 1958
Serial No. 726,608

5 Claims. (Cl. 106—243)

This invention relates to surface coating resins. More particularly, it relates to air drying films from metal salts of unsaturated fatty acids and hydroxy carboxylic acids.

Conventional surface coating resins derived from, e.g., alkyd resins, require lengthy pretreatment before satisfactory films may be cast therefrom. Usually, this pretreatment takes the form of resinification under heat for several hours. More recently, it has been discovered that air drying films are preparable by the reaction of aluminum alkoxides with unsaturated fatty acids at room temperature. However, films prepared therefrom exhibit poor adhesion to metal, wood, glass, etc. surfaces.

It is an object of this invention to provide novel surface coating resins.

Another object is the provision of novel surface coating resins preparable at room temperature, resinification occurring spontaneously upon mixing and capable of resinifying in situ.

Another object is the provision of hard, solvent resistant surface coating resins capable of air drying and possessed of excellent adhesive qualities.

These and other objects are obtained by reacting a metal Lewis base wherein the metal is in a valency state of at least 3 with a mixture of an unsaturated fatty acid containing from 10–18 carbon atoms and a mono- or poly-basic hydroxy acid containing from 2–18 carbon atoms.

The following examples are given in illustration of the invention and are not intended as limitations thereof. Where parts are mentioned, they are parts by weight.

*Example I*

1.5 parts (about 0.02 eq.) of aluminum tri-isopropoxide are dissolved in 50 parts of xylene and to the solution is added a mixture of 2.8 parts (about 0.01 eq.) of soya fatty acids and 3.0 parts (about 0.01 eq.) of ricinoleic acid. One drop of cobalt naphthenate is added to the resulting viscous solution and this solution is cast in a 0.003 inch film on a clean glass plate. After the solvent is evaporated, the film is heated to 150° C. for 15 minutes. A hard, tough, clear film is obtained which is insoluble in xylene and 10% sodium hydroxide solution. This film could not be peeled from the glass, but was later removed by abrasion.

*Example II*

1.7 parts (about 0.02 eq.) of titanium tetra-butoxide is dissolved in 50 parts of butanol and to the solution is added a mixture of 2.8 parts (about 0.01 eq.) of linseed acids and 0.75 part (about 0.01 eq.) of tartaric acid. One drop of cobalt naphthenate is added to the resulting viscous solution and this solution is cast in a 0.003 inch film on a clean glass plate. The film is permitted to dry at room temperature in contact with air. After 6 hours of drying, a hard, tough, clear film is obtained which is insoluble in xylene and 10% sodium hydroxide solution. This film cannot be peeled from the glass.

*Example III*

Twenty-eight parts of a xylene solution containing 20% by weight (about 0.02 eq.) of tall oil fatty acids is mixed with 14 parts of a xylene solution containing 20% by weight (about 0.01 eq.) of ricinoleic acid. To this solution is added 10.2 parts by weight of a xylene solution containing 20% by weight (about 0.03 eq.) of aluminum tri-isopropoxide. One drop of cobalt naphthenate is added to the resulting viscous solution which is then cast in 0.003 inch films on two 10 mil metal plates. One film is heated to 150° C. for 20 minutes to obtain a clear, hard film which is insoluble in xylene. The second film is permitted to dry at room temperature in contact with air. After 2 hours the film is non-tacky and after 6 hours a clear film is obtained which is insoluble in xylene. Both films possess excellent adhesive qualities and cannot be peeled from the metal plates.

*Example IV*

Example III is repeated substituting 0.007 eq. of the tall oil fatty acids with 0.007 eq. of dehydrated castor acids. Hard, tough, films possessed of equivalent adhesive qualities and insoluble in xylene and 10% sodium hydroxide solution are obtained.

The metal Lewis bases employed in this invention are the alkoxides, hydroxides and the mixed alkoxy-hydroxides of metals having a valency state of 3 or higher. Examples of such metals are aluminum III, iron III, titanium IV, manganese IV, chromium III, etc. The alkoxide groups which are combined with these metals are those containing from 1–10 carbon atoms. These include the methoxides, ethoxides, propoxides, isopropoxides, butoxides, isobutoxides, amoxides, hexoxides, octoxides, 2-ethyl butoxides, 2-ethyl hexoxides, etc. When using the mixed alkoxy-hydroxides of metals having a valency of $n$, from 1 to $n-1$ alkoxy groups may be present, the remainder of the valences being satisfied by hydroxy groups. Especially preferred are the 1–5 carbon atom alkoxides of aluminum III, e.g., monoethoxy aluminum dihydroxide, aluminum triisopropoxide, dibutoxy aluminum monohydroxide, etc.

The unsaturated fatty acids of this invention are those containing from 10–18 carbon atoms. These include the decylenic acids, palmitoleic acid, oleic acid, linoleic acid, linolenic acid, etc. In a preferred embodiment the fatty acids of drying or semi-drying oils containing mixtures of these unsaturated fatty acids are employed. For example, the fatty acids of cottonseed oil, tall oil, soybean oil, linseed oil, dehydrated castor oil, safflower oil, etc., or mixtures thereof may be employed. In a preferred embodiment, a mixture of tall oil acids and one of the above mentioned drying oils is used.

The mono- and poly-basic hydroxy acids of this invention contain from 2–18 carbon atoms and contain at least one hydroxy group per molecule. Saturated or unsaturated mono- and poly-basic hydroxy acids may be used. Examples of such acids include glycolic acid, lactic acid, maleic acid, tartaric acid, citric acid, glycuronic acid, mandelic acid, 12-hydroxy stearic acid, ricinoleic acid, etc.

In combining the metal Lewis base, the unsaturated fatty acid and the mono- or poly-basic hydroxy acid it is necessary that from 1.0 to 1.5 equivalents of the metal Lewis base be used per equivalent of total mixed acids. It is further required that the mono- or poly-basic hydroxy acids comprise from 10–40% of the total equivalents of the mixed acids. In other words, the proportions employed are:

(a) Metal Lewis base _____ 1.0–1.5 eq.
(b) Total mixed acids _____ 1.0 eq.
   (1) Unsaturated fatty acid _____ 0.6–0.9 eq.
   (2) Mono- or poly-basic hydroxy acid_ 0.4–0.1 eq.

In preparing surface coating resins according to this invention, the metal Lewis base, the unsaturated fatty acid and the mono- or poly-basic hydroxy carboxylic acid may be dissolved in any order in a conventional volatile solvent. Examples of such solvents are xylene, butanol, xylene-butanol mixtures, xylene-mineral spirits mixtures, etc. Resinification occurs at room temperature although elevated temperatures may be employed.

In one embodiment, the active ingredients are stored in two separate containers prior to use, one containing a metal alkoxide dissolved in a minimum of solvent and the other containing the mixed acids. When stored in this way, shelf lives of several years are obtainable. At the time of use the active ingredients are combined in the correct proportions and applied to the desired surfaces. In a preferred embodiment, each container is connected by means of, e.g., rubber tubing to the mixing chamber or nozzle of a conventional spraying device. In this latter method, the mixing of the active ingredients and application thereof to the surface occur substantially simultaneously. This method also enables use of a bare minimum of solvent, thus reducing fire hazard and obviating the need for solvent recovery.

Surface coatings prepared using drying oil acids, particularly those of the more rapidly drying oils may be dried at room temperature. To those surface coating compositions prepared using slower drying or semi-drying oils a few drops of a conventional dryer, e.g., cobalt naphthenate, zinc naphthenate, manganese naphthenate, etc. will greatly facilitate drying. The surface coating resins of this invention may also be baked at elevated temperatures to produce hard solvent resistant films.

The surface coating compositions of this invention may be formulated with waxes, fillers, stabilizers, pigments, etc. to form durable, weather-resistant outdoor paints, interior paints, and protective coatings. Surfaces which may be so coated include wood, metal, glass, plastics, etc.

Many variations may be made in the above specification without affecting the spirit and scope thereof.

What is claimed is:

1. A surface coating composition comprising a mixture of (1) from 1.0–1.5 equivalent proportions of a metal Lewis base and (2) a total of 1.0 equivalent proportions of mixed acids, each equivalent proportion of said mixed acids comprising (a) from 0.6–0.9 equivalent proportions of an unsaturated fatty acid and (b) from 0.4–0.1 equivalent proportions of a hydroxy carboxylic acid, dissolved in an inert volatile organic solvent; said metal Lewis base being selected from the group consisting of hydroxides, alkoxides and the mixed alkoxy-hydroxides of metals having a valence state of from 3–4, wherein each alkoxide group contains from 1–10 carbon atoms; said unsaturated fatty acid being selected from the group consisting of unsaturated fatty acids containing from 10–18 carbon atoms, the fatty acids of drying and semi-drying oils containing mixtures thereof, and mixtures thereof; said hydroxy carboxylic acid being selected from the group consisting of saturated and unsaturated aliphatic mono- and poly-basic hydroxy acids containing from 2–18 carbon atoms.

2. A surface coating composition as in claim 1 wherein the metal Lewis base is an aluminum alkoxide wherein each alkoxide group contains from 1–5 carbon atoms.

3. A surface coating composition as in claim 1 wherein the unsaturated fatty acid is a mixture of the fatty acids of tall oil and a drying oil.

4. A surface coating composition as in claim 1 wherein (1) the metal Lewis base is selected from the group consisting of aluminum tri-alkoxides, monoalkoxy aluminum dihydroxides and dialkoxy aluminum monohydroxides wherein each alkoxide group contains from 1–5 carbon atoms and (2) the unsaturated fatty acid is a mixture of the fatty acids of tall oil and a drying oil.

5. A process for coating a surface which comprises independently preparing (1) a solution of a metal alkoxide dissolved in an inert volatile organic solvent and (2) a mixture of (a) from 0.6 to 0.9 equivalent proportions of an unsaturated fatty acid and (b) from 0.4 to 0.1 equivalent proportions of a hydroxy carboxylic acid, and subsequently combining solutions (1) and (2) in the proportions of from 1.0 to 1.5 equivalents of metal alkoxide per equivalent of total mixed acids and substantially instantaneously thereafter applying the combined solution to a surface and drying; said metal alkoxide being selected from the group consisting of the alkoxides and the mixed alkoxy-hydroxides of metals having a valence state of from 3–4 wherein each alkoxide group contains from 1–10 carbon atoms; said unsaturated fatty acid being selected from the group consisting of unsaturated fatty acids containing from 10–18 carbon atoms, the fatty acids of drying and semi-drying oils containing mixtures thereof, and mixtures thereof; said hydroxy carboxylic acid being selected from the group consisting of saturated and unsaturated mono- and poly-basic hydroxy acids containing from 2–18 carbon atoms.

References Cited in the file of this patent

UNITED STATES PATENTS

| | | |
|---|---|---|
| 2,708,203 | Haslam | May 10, 1955 |
| 2,742,448 | Beacham et al. | Apr. 17, 1956 |
| 2,754,277 | McNabb | July 18, 1956 |

OTHER REFERENCES

Weiss: Journal of Oil and Colour Chemists' Association, volume 40 (1957), pages 864–879.